United States Patent
Hong et al.

[19]

[11] Patent Number: 5,841,556
[45] Date of Patent: Nov. 24, 1998

[54] OPTICAL SWITCHING SYSTEM WITH COMBINED SPACE AND WAVELENGTH DIVISION MULTIPLEX BASED ON THE REPEATED CONTENTION RESOLUTION TECHNIQUE

[75] Inventors: Hyun Ha Hong; Yong Hyub Won, both of Daejeon, Rep. of Korea

[73] Assignee: Electronics and Telecommunications Research Institute, Daejeon, Rep. of Korea

[21] Appl. No.: 780,122

[22] Filed: Dec. 26, 1996

[51] Int. Cl.$^6$ ...................................... H04J 14/00
[52] U.S. Cl. .................... 359/117; 359/123; 359/137; 370/395
[58] Field of Search ..................... 359/117, 123, 359/118, 119, 120, 121, 125, 136, 137, 140, 139; 370/355, 390, 395, 405, 406

[56] References Cited

U.S. PATENT DOCUMENTS

| | | | |
|---|---|---|---|
| 5,438,566 | 8/1995 | Masetti et al. | 359/117 |
| 5,530,575 | 6/1996 | Acampora et al. | 359/128 |
| 5,541,914 | 7/1996 | Krishnamoorthy et al. | 359/117 |
| 5,724,167 | 3/1998 | Sabella | 359/128 |

OTHER PUBLICATIONS

Kai Y. Eng, "A Photonic Knockout Switch for High–Speed Packet Networks", IEEE Journal on Selected Areas in Communications, Aug. 1988, vol. 6, No. 7, pp. 1107–1116.

*Primary Examiner*—Rafael Bacares
*Attorney, Agent, or Firm*—Jacobson, Price, Holman & Stern, PLLC

[57] ABSTRACT

Disclosed is an optical switching system with a combined space and wavelength division multiplex based on the repeated contention technique. The present invention has effects on high capacity in required in the optical switch module, by performing the contention resolution over a two consecutive cell time slot which repeatedly employs the present and previous state information. According to the present invention, the input cells make use of a switching opportunity two times. As a result, the present invention maintains the desired probability of cell loss, keeping up the state values L small. Also, the present invention can decrease the number of filters because it is possible to decrease the number of wavelength used for the wavelength conversion. Furthermore, the present invention has an effect on the high capacity based on the extension of the optical switch modules.

9 Claims, 5 Drawing Sheets

OPTICAL SWITCHING SYSTEM WITH COMBINED SPACE AND WAVELENGTH DIVISION MULTIPLEX BASED ON THE REPEATED CONTENTION RESOLUTION TECHNIQUE

BACKGROUND OF THE INVENTION

1. Field of the Invention

The present invention relates to an optical switching system with a combined space and wavelength division multiplex based on the repeated contention resolution technique, in particular, to a high capacity ATM switching system which is capable of providing subscribers, a voice service, a data service, an image service, and a broadband video services such as an HDTV (High Definition Television) distribution service with a switching capacity above a few Tb/s.

2. Description of the Related Art

In general, in realizing an NXN self-routing optical switch, the conventional space switch with a wavelength division has an effect on the decrease in the number of optical components required in a single output port in compliance with the adaption of the repeated contention resolution process and the optical components may decrease in number by about 50%. However, in the case of a high capacity optical switch (i.e., N, which is the number of the input or output ports, is large), the dimension of a star coupler becomes larger up to the number of (N+N/2)×(4N+N/2) and N/2 single-frequency laser diodes and tunable frequency filters are required.

Furthermore, in the case of the optical switching system with a space and wavelength division multiplex, by multiplexing a plurality of cells, each of which has a different wavelength, in an internal link on the space switch, the size of the space switch is fixed to N×N so that it is appropriate for a high capacity switch. However, it has a drawback in that the range of the tunable wavelength of a light source is too broad to insure a predetermined cell loss probability because an optical switching system uses only the contention resolution process over one time slot.

SUMMARY OF THE INVENTION

Therefore, it is an object of the present invention to provide an optical switching system capable of maintaining a predetermined cell loss rate, decreasing the number of fixed filters and the size of the optical switch, by forming optical switching subsystems with a combined space and wavelength division multiplex in parallel and by performing a contention resolution over two-time slot.

It is another object of the present invention to provide an optical switching system capable of increasing its capacity, by adding an optical switch as a basic unit.

In accordance with an aspect of the present invention, there is provided an optical switching system including a plurality of subsystems, the subsystems including: a plurality of input cell processing means for extracting a destination address from a cell input from a multiplexing means within the system, inspecting a state value related to the destination address, adding routing information to a header of the cell, performing a wavelength conversion for the cell in response to wavelength information, wherein the state value is one of state values which correspond to the subsystems in the ratio of one to one, wherein the input cell processing means converts a wavelength of the cell in response to the wavelength information, and wherein the input cell is transmitted to a space division switching means to be routed to a destination port at a present or next time slot; a space division switching means for receiving the output of the input cell processing means, examining whether the routing information is added to the cell or not, and coupling the cells which undergo the wavelength conversion, wherein the space division switching means delays the cells for one time slot if the routing information is added to the cell, and wherein the space division switching means outputs the cells without delay time if the routing information is not added to the cell; a plurality of wavelength group demultiplexing means for receiving the output of the space division switching means, demultiplexing the coupled cells; and an output means for receiving the output of the wavelength group demultiplexing means, filtering the demultiplexed cells by fixed wavelengths filters, wherein each of the wavelength group demultiplexing means is coupled to each of the output means within each of the subsystem.

BRIEF DESCRIPTION OF THE DRAWINGS

The above and other objects, advantages and features of the present invention will be more apparent from the following detailed description taken with the attached drawings, in which.

DETAILED DESCRIPTION OF THE PREFERRED EMBODIMENT

Hereinafter, the present invention will be described in detail referring to the accompanying drawings.

Figure 1:
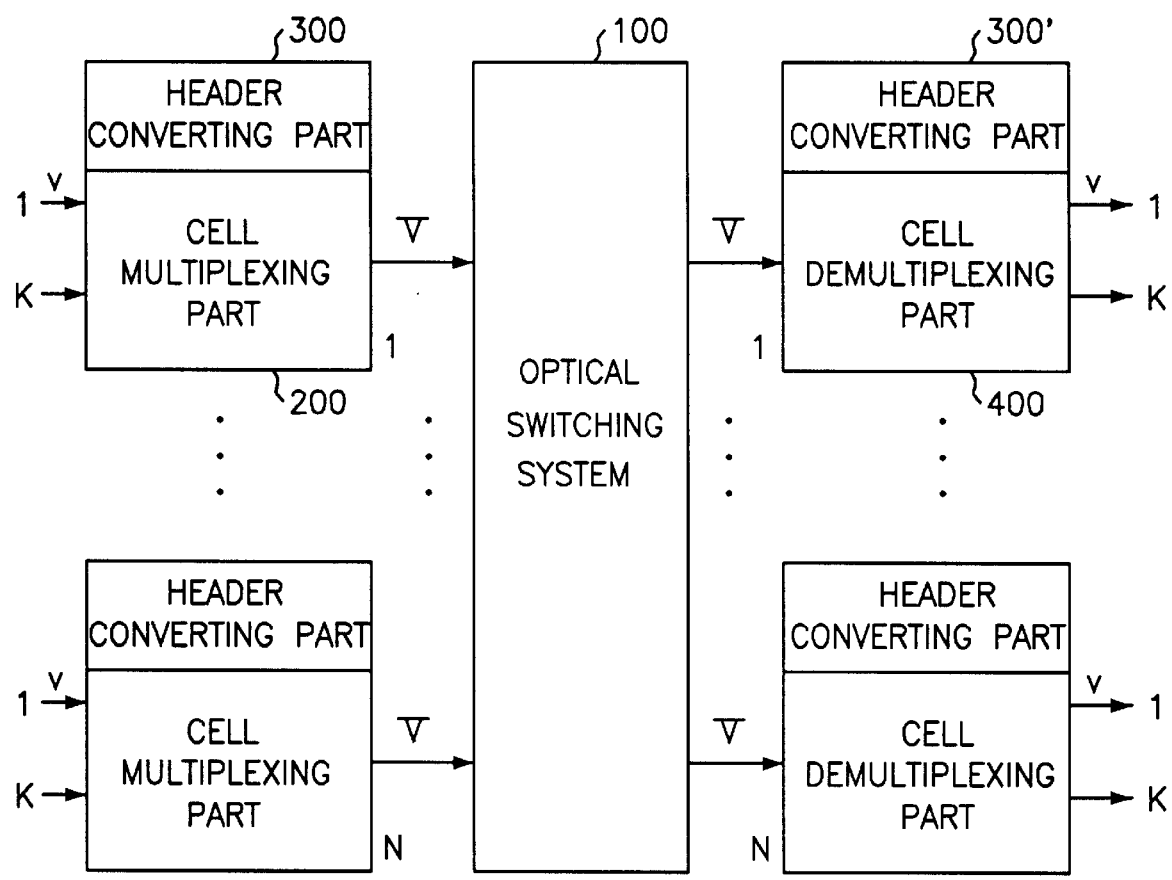
FIG. 1 is a block diagram showing an ATM switching system according to the present invention.

First, FIG. 1 is a block diagram showing an ATM switching system according to the present invention. As shown in FIG. 1, input/output signals, which are ATM cells of 53 bytes in an optical ATM exchanging system, have a predetermined transmission rate v, for example, 155 Mb/s. A cell multiplexing part 200, which is composed of electric circuits, is coupled to an optical switching system 100 via a data bus V. The input cells are processed by a header converting part 300, and the processed input cells are stored in a buffer within the cell multiplexing part 200 to avoid a cell loss due to the instantaneous call congestion.

After receiving from the cell multiplexing parts 200 a plurality of cells on each time slot, the optical switching system 100 recognizes the destination address of each of the cells and outputs the input cells into a cell demultiplexing part 400 having the corresponding destination address via a data bus at a predetermined transmission rate V, performing the self-routing switching function.

In the case where a plurality of input cells are simultaneously switched to the same cell demultiplexing part 400, the optical switching system 100 should insure a minimum cell loss to keep its cell loss to a minimum.

The cell demultiplexing part 400, which is composed of electric circuits, converts the header of the input cell by a header converting part 300', and temporarily stores the converted input cell in a buffer, and then outputs the ATM cells at a predetermined transmission rate V (155 Mb/s).

Accordingly, since the capacity of the optical ATM exchange system depends on the architecture and the switching method of the optical switching system 100, the capacity thereof may easily increase, by constructing the optical switching systems with a combined space and wavelength division multiplex in parallel. Also, in the optical switching system, the number of the component like a fixed filter and the dimension of the optical switching systems may be kept minimum, by applying the contention resolution to the unit switch over two-time slot.

Figure 2:
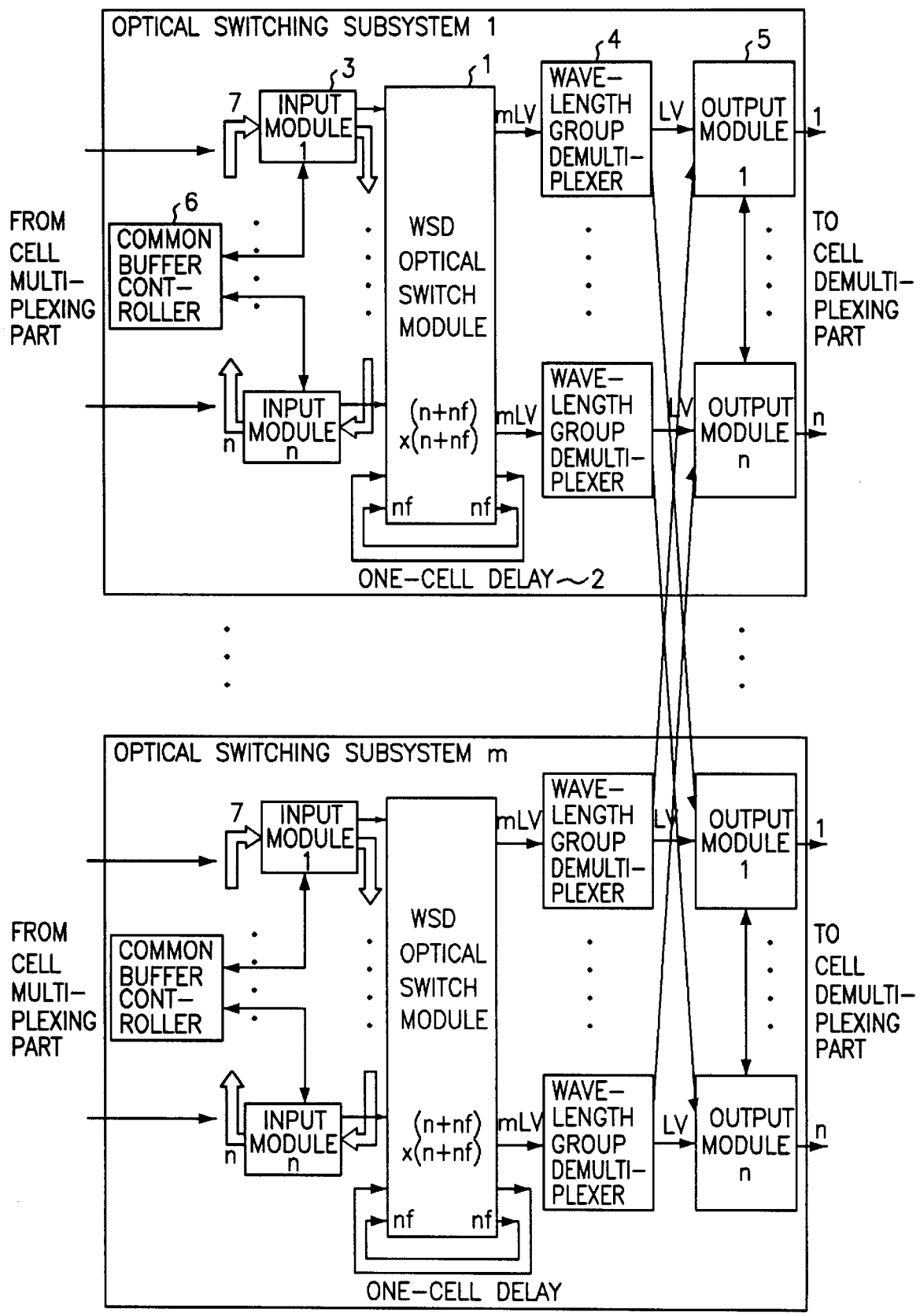
FIG. 2 is a block diagram showing an optical switching system based on a contention resolution according to the present invention.

FIG. 2 is a block diagram showing an optical switching system based on a contention resolution according to the present invention, in which the reference numerals 1, 2, 3, 4, 5 and 6 denote a wavelength-multiplex and space-division optical switch module (hereinafter, referred to as a WSM optical switch module), an one-cell delay, an input module, a wavelength group demultiplexer, an output module and a common buffer controller, respectively.

As shown in FIG. 2, the optical switching system according to the present invention includes m optical switching subsystems, which comprise the WSM optical switch module 1, the one-cell delay 2, the n input module 3, the n wavelength group demultiplexers 4, the n output modules 5 and the common buffer controller 6.

The input and output ports of the WSM optical switch module 1 are respectively coupled to the n input modules 3 and the n wavelength group demultiplexers 4, using a unidirectional connection by optical fibers. The one-cell delay 2 is coupled to the input and output ports of the WSM optical switch module 1 by nf optical fibers.

The input port of the output module 5 is coupled to the output port of each of the wavelength group demultiplexers 4 within each of the n optical switching subsystems by m optical fibers.

The common buffer controller 6 is coupled to the n input modules 3 by bidirectional control signal lines. Also, each of the n input modules 3 is coupled to the others by the unidirectional control signal line 7, constructing a ring type.

In the case where cells reach each input module 3, each input module 3 interprets a destination address from the header of the received cell and determines the input cells arriving for the same output port of the WSM optical switch module 1. At this time, each input module 3 converts the wavelength of each input cell so as not to have the wavelengths duplicated in each output port of the WSM optical switch modules 1, by performing the contention resolution with unidirectional signal line 7.

The unidirectional control signal lines 7 are composed of m parallel buses which correspond to the m optical switching subsystems in the ratio of one to one. Each n contention resolution packets mapped to n input module with one-to-one correspondence circulate, in turn, once time through each parallel bus between its related input modules within the one time slot of the input cell. With respect to each output port of the switch modules, the corresponding contention resolution packet is composed of two random variables M1 and M2 describing a switch state of the system in two consecutive cell time slot. Each value of the two random variables especially indicates a specific wavelength of the wavelength group, and it is called a state information of the system. The random variables M1 indicates the state of the cells stored in the buffer due to fail in the contention at previous time slot. The random variable M2 indicates the state of the input cells to be buffered due to fail in the contention at time slot at which the cells arrive, and to be routed in the next time slot. Each value of M1 and M2 fluctuates from slot to slot, and its range is given by $0 \leq M, L \geq M2$.

Each of the input modules 3 interprets the destination address from the header of the input cell, and if the contention resolution packet, which has the corresponding output address of the switch module 1, is received from the previous input module, the input module 3 inspects, in order, the values of the random variable M1 or M2 of the contention resolution packet, and updates one value of the corresponding random variable lest the wavelength information used for converting the wavelength of the input cell should be duplicated. Also, after changing the state of the contention resolution packet, the input module 3 transmits the contention resolution packet to the next input module.

If the contention resolution procedure for one period has been finished, each of the input modules 3 substitutes the state information of the M1 for the state information of the M2 and this process is repeatedly performed with respect to the next input cell.

Therefore, considering the time slot at which each cell arrives, the state information of the M1 has, in each of contention resolution packets, information relative to the number of cells and the assigned wavelength for each input cells which are switched to the corresponding output port of the switch module. Since the state values of the M1 can be assigned by up to L, the system may perform a wavelength conversion according to the L different wavelengths for the L input cells. Also, since the state values of the M2 can be stored by up to L, if the state value of the M1 is I at an arbitrary time slot, different wavelengths are selected for 2L–I input cells through the contention resolution. However, the input cells more than 2L–I cells may be lost on the selection of the wavelength.

In the case where the destination address of the input cell is interpreted and the result of the interpretation is switched to a different optical switching subsystem, the contention resolution, as illustrate above, is preformed through one of the m unidirectional control signal lines 7 which are corresponds to the optical switching subsystem in the ratio of one by one, and then the different groups of the L wavelengths are indicated and selected to avoid the duplication of the wavelengths. In other wards, when the destination address of the cell relates to the output port in the first optical switching subsystem, the wavelength conversion for this input cell is selected from the wavelength group $W_{11}, W_{12}, W_{13}, \ldots W_{1L}$, and in the second optical switching subsystem, $W_{21}, W_{22}, W_{23}, \ldots W_{1L}$, and in the m-th optical switching subsystem, $W_{m1}, W_{m2}, W_{m3}, \ldots W_{mL}$, respectively.

When a plurality of cells, which are input into the input port of an optical switching subsystem, are switched to any optical switching subsystem, they are switched to the output port with the wavelength division multiplex without delay time, if the number of the input cells, which are continuously input into the input port, are not more than the state values L. The reason is that the input cell, in the corresponding wavelength group, can be converted into the different wavelengths from the state value of the M1 to the L state values, by using the contention resolution preformed through one of the m unidirectional control signal lines 7 which are corresponds to the optical switching subsystem in the ratio of one by one.

However, in the case where the state value of the M1 is I and the I cells are already stored in the one-cell delay 2, the L−1 input cells are switched to the output port without time delay in response to the state information of the M1 in the contention resolution process. Other input cells perform the L different wavelength conversions in response to the state information of the M2 in the contention resolution process, and the input module 3 receives routing information including the address of the one-cell delay 2 from the common buffer controller 6 and inserts it into the cell header, and then transmits to the WSM optical switch module 1. Next, these input cells are stored for the one time slot in the one-cell delay 2, and switched to the corresponding output port.

If the common buffer controller 6 receives a request signal from the input module 3 for using the one-cell delay, it sorts the received destination addresses. At this time, the common buffer controller 6 send to the corresponding input module 3 the routing information including the address of the one-cell delay 2 in order that the input cells having the same destination address within the optical switching subsystem are stored in one-cell delay 2 with different wavelengths during one time slot even if the addresses of the optical switching subsystems are not the same.

The WSM optical switch module 1 interprets the routing information received from the input module 3. If the routing information doesn't include the address of the one-cell delay 2, the input cell is switched to the output port of the WSM optical switch module 1 corresponding to the destination address, and if the routing information includes the address of the one-cell delay 2, the input cell is switched to the output port of the WSM optical switch module 1 coupled to the corresponding one-cell delay 2.

In addition, the input cell from the one-cell delay 2 is switched to the output port of the WSM optical switch module 1 corresponding to the destination address within the routing information.

As stated above, since the input cells converted by the present state information of the M2 of the contention resolution packet are stored in the one-cell delay 2 with wavelengths multiplexed status, the number of input/output ports (nf) decreases and then high capacity in required in the optical switch module can be achieved.

The wavelength group demultiplexer 4 receives the mL wavelength multiplexed cells with the m wavelength groups, which are toward the same output port in the m optical switching subsystems of the WSM optical switch module 1, so that it demultiplexes these wavelength signals by wavelength groups. The wavelength group demultiplexer 4 transmits through optical fibers the demultiplexed wavelength group $W_{11}, W_{12}, W_{13}, \ldots W_{1L}; W_{21}, W_{22}, W_{23}, \ldots W_{2L}; \ldots; W_{m1}, W_{m2}, W_{m3}, \ldots W_{mL}$ to the first, second and m-th optical switching subsystem, respectively.

Each output module 5 receives the mL cells at its maximum from the output port of the m wavelength group demultiplexes 4 in the m optical switching subsystems by the m optical fibers. That is to say, since the wavelength group signals of the cells, which are input from the wavelength group multiplexer 4 to the output module 5, corresponds to the optical switching subsystem to which the output module 5 belongs, all the output modules 5 in the optical switching subsystem receives the same signals within the wavelength group by the optical fibers.

For example, since the output module 5 in the i-th optical switching subsystem must receive the mL cells multiplexed by the i-th wavelength group with the wavelength division, it receives the mL cells at its maximum, using m fixed filters (wavelength filter $W_{11}, W_{12}, W_{13}, \ldots W_{1L}$) capable of selecting the L cells for the i-th wavelength group.

Because each of the output modules 5 is coupled to the cell demultiplexing part 400 by the data bus of transmission rate V, it temporally stores cell in the buffer to prevent a cell loss and outputs, in order, each cell to the cell demultiplexing part 400.

As stated above, by performing the contention resolution over a two consecutive cell time slot which repeatedly employs the state information of the M1 and M2, the input cells make use of a switching opportunity two times. As a result, the present invention maintains the desired cell loss, keeping up the state values L small. Also, the present invention can decrease the number of filters because it is possible to decrease the number of wavelengths used for the wavelength conversion.

Furthermore, since the input cells converted by the present state information of the M2 on the contention resolution packet are stored in the one-cell delay 2 with wavelengths multiplexed status, the number of input/output ports (nf) required for connecting the one-cell delays, which is added to the optical switch module 1, may be composed of n/(L+1) ports and then high capacity in required in the optical switch module can be achieved.

Figure 3:
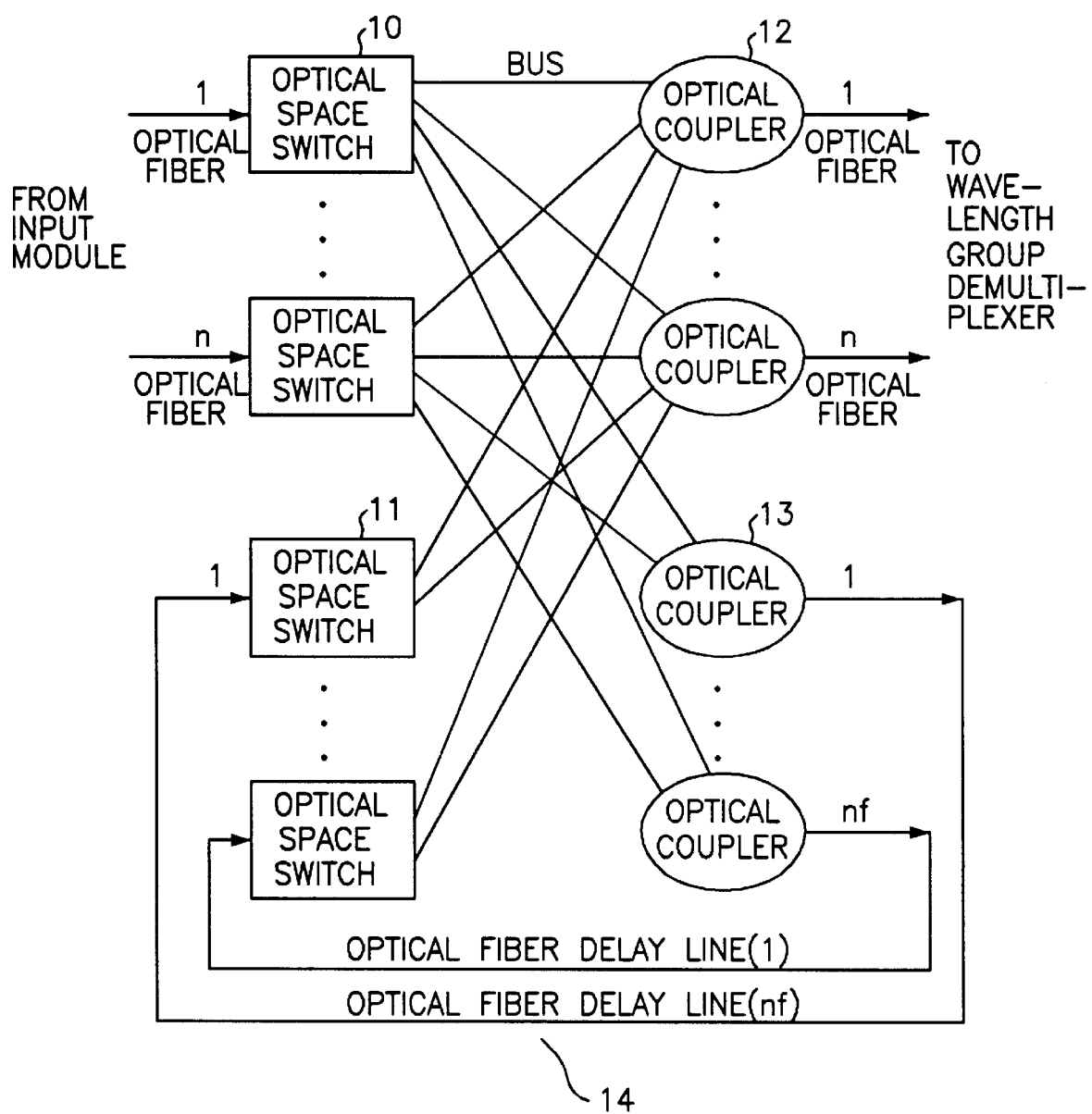
FIG. 3 is a block diagram showing an optical switch module with a wavelength and space division multiplex according to the present invention.

FIG. 3 is a block diagram showing an optical switch module with a wavelength and space division according to the present invention.

As shown in FIG. 3, the WSM optical switch modules 1 includes n+nf optical space switches 10 and 11 and n+nf optical couplers 12 and 13, and an one-cell delay 3 includes nf optical fiber delay lines 14.

The optical space switches 10 and 11 include an input port and n+nf output ports, and the optical couplers 12 and 13 include n+nf input ports and an output port.

The n optical space switches 10 are coupled to the input module 3 through the optical fibers and the output ports thereof are coupled to the n+nf optical couplers 12 and 13 in the ratio of one to one by unidirectional optical fiber lines. Also, the output ports of the nf optical space switches 11, which are coupled to the optical fiber delay lines 14, coupled to n optical couplers 12 in the ratio of one to one by the optical fiber lines.

Therefore, the output ports of the nf optical space switches 11 are not coupled to the input ports of the nf optical couplers 13 but coupled to the input ports of the n optical couplers 12. Also, each of the n optical couplers 12 is respectively coupled to each of the wavelength group demultiplexers 4 by one optical fiber line in the ratio of one to one.

The optical space switches 10 interprets the routing information of the input cells from the input module 3. At this time, if the address for the cell delay 2 is not included in the routing information, the input cell is directly switched to the input port of the optical coupler 12 corresponding to the destination address. If the address is included in the routing information, the input cell is switched to the input port of the optical coupler 13 coupled to the corresponding optical fiber delay line 14.

The optical space switch 11 coupled to the optical fiber delay line 14 outputs each input cell to the output port of the optical coupler 12 corresponding to the destination address in the routing information of the input cell. Accordingly, the mL input cells with the wavelength division multiplex are stored in the optical fiber delay line 14 for one time slot as one element of the wavelength group $W_{11}, W_{12}, W_{13}, \ldots$ $W_{1L}$; $W_{21}$, $W_{22}$, $W_{23}$, ... $W_{2L}$; ...; $W_{m1}$, $W_{m2}$, $W_{m3}$, ... $W_{mL}$ and then are switched to the corresponding output port at the next cell time slot. The optical couplers 12 output the mL multiplexed input cells with different wavelengths to the wavelength group demultiplexers 4 through optical fibers.

Figure 4:
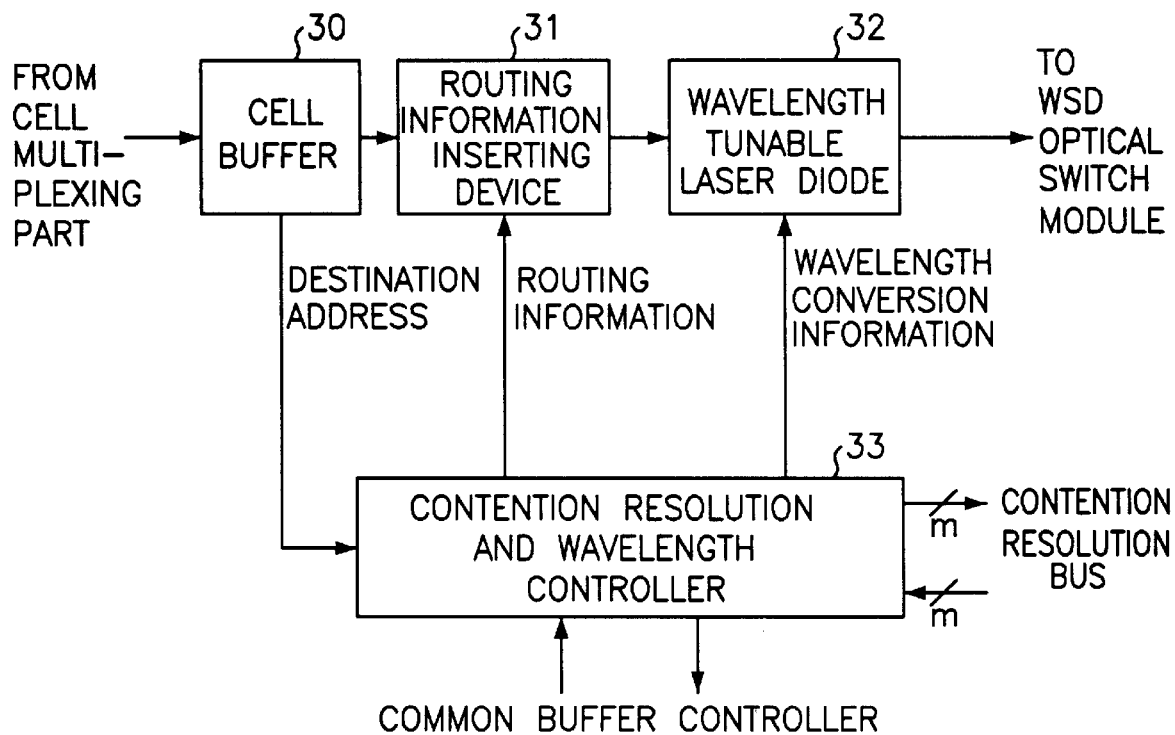
FIG. 4 is a block diagram showing an input module according to the present invention.

FIG. 4 is a block diagram showing an input module according to the present invention. The input module 3 includes a cell buffer 30, a routing information inserting device 31, a wavelength tunable laser diode 32 and a contention resolution and wavelength controller 33.

After a cell arrives at the cell buffer 30 from the cell multiplexing part 200, the destination address, which is included in the cell header, is transmitted to the contention resolution and wavelength controller 33 and then the input cell is sent to the routing information inserting device 31.

The contention resolution and wavelength controller 33 performs the contention resolution process over two consecutive time slot through the m contention resolution parallel buses which are the control signal lines 7, using the contention resolution packets. That is, in the case where the state values of the M1 of the packets, which are output from the parallel buses, is less than L, the contention resolution and wavelength controller 33 selects one wavelength conversion information from the corresponding wavelength group, using the state values of the M1. In the case where the state values of the M1 of the packets, which are output from the parallel buses, is more than L, the contention resolution and wavelength controller 33 inspects the state value of the M2 in the contention resolution packets and it only selects one wavelength conversion information from the state value of the M2 in the case where it is less than L.

In the case where both state values of the M1 and M2 of the contention resolution packets are more than L, the system generates a cell loss because the specific wavelength for the input cell can not be selected.

In this manner, after selecting one wavelength, the contention resolution and wavelength controller 33 increases by one the corresponding state value to which is applied the wavelength selection process and transmits the contention resolution packets to the next input module through the parallel buses.

In the case where one wavelength is selected from the state values of the M2 only, the contention resolution and wavelength controller 33 transmits the routing information to the routing information inserting device 31 after receiving the allotted address of the one-cell delay 2.

The routing information inserting device 31 inserts the routing information received from the contention resolution and wavelength controller 33 into the cell header received from the cell buffer 30. The wavelength tunable laser diode 32 converts the wavelength of the cell received from the routing information inserting device 31 in response to the wavelength conversion information received from the contention resolution and wavelength controller 33, and then transmits the converted cell to the WSM optical switch module 1.

Figure 5:
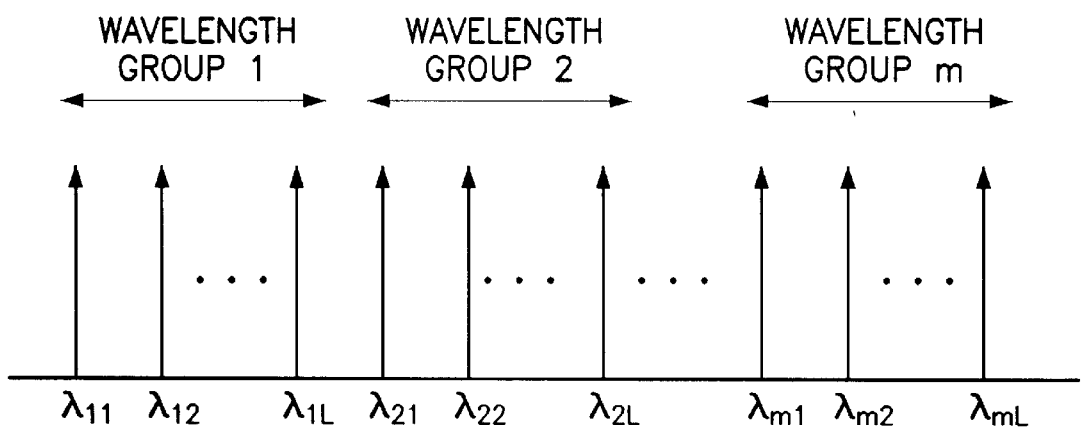
FIG. 5 is a schematic view showing the tuning range of wavelengths of a laser diode according to the present invention.

FIG. 5 is a schematic view showing the variation of wavelength of a laser diode according to the present invention, in which shown is m wavelength groups. The m wavelength groups corresponds to the m optical switching subsystems in the ratio of one to one to avoid the wavelength duplication in the input module 3 which performs the wavelength conversion. The wavelength tunable laser diode 32 receives one wavelength information of the mL wavelength from the contention resolution and wavelength controller 33.

Figure 6:
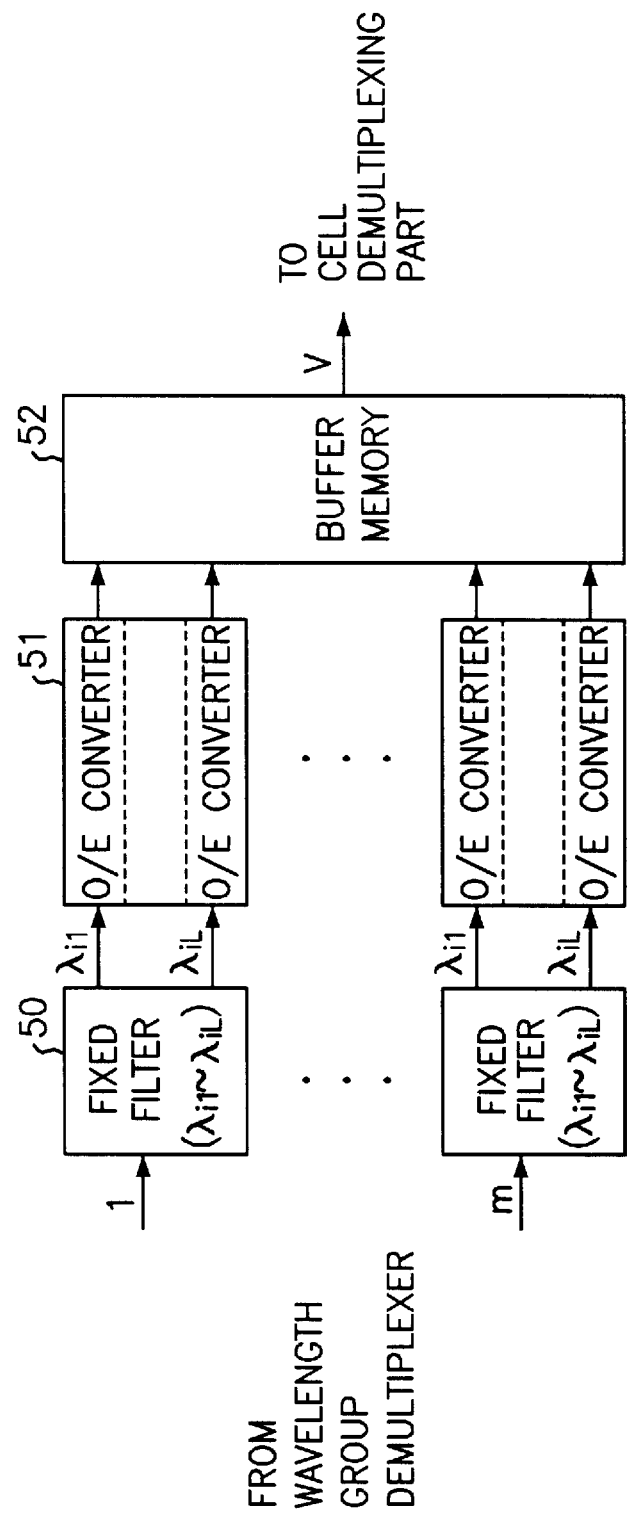
FIG. 6 is a block diagram showing an output module according to the present invention.

FIG. 6 is a block diagram showing an output module according to the present invention. The output module 5 includes a fixed filter, an optical-to-electrical (O/E) convert 51 and a buffer memory 52.

Each of the m fixed filters 50 selects L cells from the wavelength multiplexed cells input from the m wavelength group demultiplexers 4, using the fixed filters ($W_{11}$, $W_{12}$, ... $W_{iL}$) with respect to the wavelength groups i.

The O/E convert 51 converts the optical cell received through L optical fibers into an electrical signals using L optical-to-electrical conversion circuits and.

As illustrated above, the output module 5 processes mL cells simultaneously and temporarily stores the cells in the buffer memory 52. The buffer memory 52 outputs the input cells to the cell demultiplexing part 400 at the speed of V, keeping the order of their input.

In embodying the present invention using the 4 optical switching subsystems, under the conditions of the input traffic intensity of 0.9 and the cell loss probability of 1E–11, the dimension of the optical switching subsystem may be $(n+n/5) \times (n+n/5)$.

As apparent from the above statement, the present invention has effects on high capacity in required in the optical switch module, by performing the contention resolution over a two consecutive cell time slot which repeatedly employs the present and previous state information. According to the present invention, the input cells make use of a switching opportunity two times. As a result, the present invention maintains the desired probability of cell loss, keeping up the state values L small. Also, the present invention can decrease the number of filters because it is possible to decrease the number of wavelengths used for the wavelength conversion. Furthermore, the present invention has an effect on the high capacity based on the extension of the optical switch modules.

Therefore, it should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. An optical switching system including a plurality of subsystems, the subsystems including:

a plurality of input cell processing means for extracting a destination address from a cell input from a multiplexing means within the system, inspecting a state value related to the destination address, adding routing information to a header of the cell, performing a wavelength conversion for the cell in response to wavelength information, wherein the state value is one of state values which correspond to the subsystems in the ratio of one to one, wherein the input cell processing means converts a wavelength of the cell in response to the wavelength information, and wherein the input cell is transmitted to a space division switching means to be routed to a destination port at a present or next time slot;

a space division switching means for receiving the output of the input cell processing means, examining whether the routing information is added to the cell or not, and coupling the cells which undergo the wavelength conversion, wherein the space division switching means delays the cells for one time slot if the routing information is added to the cell, and wherein the space division switching means outputs the cells without delay time if the routing information is not added to the cell;

a plurality of wavelength group demultiplexing means for receiving the output of the space division switching means, demultiplexing the coupled cells; and an output means for receiving the output of the wavelength group demultiplexing means, filtering the demultiplexed cells by fixed wavelengths filters, wherein each of the wavelength group demultiplexing means is coupled to each of the output means within each of the subsystem.

2. The optical switching system in accordance with claim 1, wherein the optical switching system further comprises a means for storing the routing information and outputting the routing information in response to the input cell processing means.

3. The optical switching system in accordance with claim 1, wherein the state value comprises previous wavelength information before one time slot and present wavelength information at a present time slot about the subsystems.

4. The optical switching system in accordance with claim 3, wherein the input cell processing means comprises:

a first means for inspecting prior wavelength information stored for previous time slot of the state value corresponding to the destination address of the cell;

a second means for performing the wavelength conversion for the cell, wherein, if there is prior wavelength information unused to the wavelength conversion, the second means converts the wavelength of the cell, using the unused prior wavelength information, wherein the second means inspects present wavelength information at the present time slot if the prior wavelength information is fully used for the wavelength conversion, wherein, if the present wavelength information is available, the second means adds to the deader of the cell so as to delay a cell transmission time for one time slot and converts the wavelength of the cell, using the present prior wavelength information, and changes the present wavelength information into the previous wavelength information.

5. The optical switching system in accordance with claim 4, wherein the input cell processing means is characterized in that each of them is coupled to the others by parallel buses corresponding to the subsystems.

6. The optical switching system in accordance with claim 3, wherein the input cell processing means comprises:

a buffer means for temporarily storing the cell input from the multiplexing means within the system;

a contention resolution and wavelength control means for extracting the destination address from the cell, examining the state value corresponding to the destination address and outputting wavelength variable information, wherein the contention resolution and wavelength control means outputs only wavelength variable information if prior wavelength information before the one time slot is available, and, if the prior wavelength information is not available and present wavelength information is available, the contention resolution and wavelength control means outputs wavelength variable information and the routing information so as to delay a cell transmission time for one time slot;

a routing information inserting means for inserting the routing information from the contention resolution and wavelength control means into the cell received from the buffer means;

a wavelength converting means for performing wavelength conversion of the cell in response to the wavelength variable information from the contention resolution and wavelength control means.

7. The optical switching system in accordance with claim 1, wherein the space division switching means comprises:

a plurality of input ports for receiving the output from the input cell processing means;

a plurality of output ports for outputting the cell to the wavelength group demultiplexing means;

a delay means for delaying a cell transmission time for one time slot if the routing information is added to the cell.

8. The optical switching system in accordance with claim 7, wherein the input ports comprises a plurality of first optical switching means for receiving the output from the input cell processing means and a plurality of second optical switching means for receiving the delayed output from the space division switching means, wherein the output ports comprises a plurality of first optical coupling means for receiving the outputs from the first and second optical switching means and a plurality of second optical coupling means for receiving the outputs from the first optical switching means, and wherein the delay means couple the second optical switching means to the second optical coupling means.

9. The optical switching system in accordance with claim 8, wherein the output means comprises:

a plurality of filtering means for selecting wavelengths corresponding to the state values from a plurality of wavelengths which are received from the wavelength group demultiplexing means;

a signal converting means for optical signals from the filtering means into electric signals;

a buffer means for temporarily storing the output from the signal converting means.

* * * * *